(12) United States Patent
Toyoda et al.

(10) Patent No.: US 11,125,258 B2
(45) Date of Patent: Sep. 21, 2021

(54) DETACHABLE WORKPIECE SUPPORT

(71) Applicant: HONDA MOTOR CO., LTD., Tokyo (JP)

(72) Inventors: Takaaki Toyoda, Tochigi-ken (JP);
Takashi Nakano, Tochigi-ken (JP);
Takafumi Murakoshi, Tochigi-ken (JP); Keiichiro Maekawa, Tochigi-ken (JP); Yuki Sato, Tochigi-ken (JP);
Kenichiro Mori, Tochigi-ken (JP)

(73) Assignee: HONDA MOTOR CO., LTD., Tokyo (JP)

(*) Notice: Subject to any disclaimer, the term of this patent is extended or adjusted under 35 U.S.C. 154(b) by 206 days.

(21) Appl. No.: 16/357,480

(22) Filed: Mar. 19, 2019

(65) Prior Publication Data

US 2019/0293095 A1     Sep. 26, 2019

(30) Foreign Application Priority Data

Mar. 22, 2018   (JP) ............................. JP2018-053731

(51) Int. Cl.
*F16B 2/06*     (2006.01)
(52) U.S. Cl.
CPC ..................................... *F16B 2/06* (2013.01)
(58) Field of Classification Search
CPC ........ F16B 2/06; H01J 37/20; B23B 2247/12;
G05B 2219/50132; G05B 2219/35025;
G05B 2219/50125; G05B 2219/31468;
G05B 2219/35314; G05B 2219/50099;
G11B 5/335; Y10T 408/567; Y10T
403/7073; Y10T 403/7075; Y10T
403/7037; Y10T 403/7005; Y10T
403/7009; B26D 7/01; B25H 1/00; B25B
5/006; B25B 1/04; B25B 1/08; B25B
5/08; B25B 1/2484; B23P 19/048
USPC ..... 403/327; 248/222.11; 269/43, 45, 71, 73
See application file for complete search history.

(56) References Cited

U.S. PATENT DOCUMENTS

| 2,255,695 | A | * | 9/1941 | Bull ...................... | E21B 17/046 |
| | | | | | 403/6 |
| 2,474,360 | A | * | 6/1949 | Jimerson ................... | F16D 1/06 |
| | | | | | 403/328 |
| 4,083,547 | A | * | 4/1978 | Gurley ...................... | B25B 1/04 |
| | | | | | 269/156 |
| 4,932,642 | A | * | 6/1990 | Salenbien ............... | B23B 31/02 |
| | | | | | 269/133 |
| 5,522,669 | A | * | 6/1996 | Recker .................... | F16D 1/116 |
| | | | | | 403/328 |

(Continued)

FOREIGN PATENT DOCUMENTS

JP          06-181042          6/1994

*Primary Examiner* — Jonathan Liu
*Assistant Examiner* — Thomas J. Bridges
(74) *Attorney, Agent, or Firm* — Amin, Turocy & Watson, LLP

(57) ABSTRACT

A connector includes a first connector body with an attachment hole and a second connector body provided with a shaft portion. A keyway is formed in a sidewall of the shaft portion. Moreover, the first connector body includes a pivoting member pivoting by being pressed by the shaft portion rotating inside the attachment hole and an elastic member for returning the pivoting member that has pivoted to an original position. The pivoting member is provided with an engaging portion engaging with the keyway.

8 Claims, 8 Drawing Sheets

(56) References Cited

U.S. PATENT DOCUMENTS

| | | | | |
|---|---|---|---|---|
| 5,642,960 | A * | 7/1997 | Salice | E05D 5/02 |
| | | | | 403/328 |
| 6,704,956 | B2 * | 3/2004 | Riley | H01R 24/58 |
| | | | | 5/600 |
| 8,376,340 | B2 * | 2/2013 | Sandmeier | B23Q 3/066 |
| | | | | 269/95 |
| 8,800,999 | B2 * | 8/2014 | Puzio | B25B 23/0057 |
| | | | | 279/75 |
| 8,939,691 | B2 * | 1/2015 | Tseng | F16B 21/04 |
| | | | | 411/347 |
| 9,339,824 | B2 * | 5/2016 | Henne | B04B 9/00 |
| 9,718,067 | B2 * | 8/2017 | Ballhause | B04B 9/08 |
| 9,841,044 | B2 * | 12/2017 | Wang | F16B 21/04 |
| 10,519,620 | B2 * | 12/2019 | Friedrich | E02F 3/3663 |
| 2005/0035303 | A1 * | 2/2005 | Ham | H01J 37/20 |
| | | | | 250/442.11 |
| 2008/0112768 | A1 * | 5/2008 | Matlack | B23Q 3/16 |
| | | | | 408/1 BD |
| 2014/0064827 | A1 * | 3/2014 | Korenromp | F16B 2/06 |
| | | | | 403/63 |
| 2017/0252902 | A1 * | 9/2017 | Boiteux | B25B 5/006 |
| 2018/0112695 | A1 * | 4/2018 | Boo | F16B 12/26 |
| 2020/0130069 | A1 * | 4/2020 | Ishikawa | B23B 31/1276 |

* cited by examiner

DETACHABLE WORKPIECE SUPPORT

CROSS-REFERENCE TO RELATED APPLICATION

This application is based upon and claims the benefit of priority from Japanese Patent Application No. 2018-053731 filed on Mar. 22, 2018, the contents of which are incorporated herein by reference.

BACKGROUND OF THE INVENTION

Field of the Invention

The present invention relates to a connector including a first connector body and a second connector body connected with each other.

Description of the Related Art

A supporting jig is used when, for example, a workpiece is supported on a workstation. In a case where multiple types of workpieces are to be supported, multiple types of supporting jigs corresponding to (in other words, designated for each of) the multiple types of workpieces need to be prepared. Usually, a supporting jig is used while being positioned and secured onto the floor of the workstation, a predetermined base, or the like. In this case, when another type of workpiece needs to be supported, the supporting jig needs to be detached from the floor or the base, and another supporting jig suitable for the next workpiece needs to be positioned and secured.

Such work is complicated and leads to loss of work time. To avoid this, a general-purpose jig is positioned and secured onto the floor or the base, and an exclusive jig is attached to and detached from the general-purpose jig. In this case, the exclusive jig is detached from the general-purpose jig when the workpiece is changed, and, subsequently, another exclusive jig suitable for the workpiece is attached to the general-purpose jig. This eliminates the need to detach and attach the general-purpose jig.

In this configuration, the exclusive jig is attached to the general-purpose jig by being locked into the general-purpose jig and is detached from the general-purpose jig by being unlocked from the general-purpose jig. Locking mechanisms include those described in, for example, Japanese Laid-Open Patent Publication No. 06-181042. That is, in the locking mechanism described in Japanese Laid-Open Patent Publication No. 06-181042, an exclusive unit is locked in a general-purpose unit by fitting hooks disposed on an upper end part of a lever member constituting the general-purpose unit into grooves formed in the exclusive unit. The hooks are separated from the grooves by rocking the lever member and the hooks while a lower end part of the lever member is pressed. As a result, the exclusive unit is unlocked from the general-purpose unit.

SUMMARY OF THE INVENTION

As is clear from the above, when the hooks are fitted into or separated from the grooves, a worker needs to press the lower end of the lever member with their hand to swing the lever member. At this time, the worker needs to hold the exclusive unit with another hand and cannot work in a stable posture.

One idea may be to assemble the general-purpose unit and the exclusive unit automatically. In this case, however, a mechanism for pressing the lower end of the lever member to swing the lever member, a mechanism for holding the exclusive unit, and the like are required. This leads to an increase in cost and to difficulty in reducing the space for the workstation.

A principal object of the present invention is to provide a connector including a first connector body and a second connector body that is easily lockable in and unlockable from the first connector body and allowing a worker to work in a stable posture.

According to an embodiment of the present invention, a connector comprises a first connector body with an attachment hole and a second connector body provided with a shaft portion, wherein the shaft portion is fitted in the attachment hole to connect the first connector body and the second connector body, a keyway is formed in a sidewall of the shaft portion, the first connector body includes a pivoting member pivoting by being pressed by the shaft portion rotating inside the attachment hole and an elastic member for returning the pivoting member that has pivoted to an original position, and the pivoting member is provided with an engaging portion engaging with the keyway.

With this configuration, the engaging portion engages with or is separated from the keyway by rotating the second connector body relative to the first connector body. The second connector body is locked with the engagement (the shaft portion is prevented from rotating and falling out of the attachment hole) and unlocked with the separation. That is, a simple task of rotating the second connector body relative to the first connector body easily enables attachment of the first connector body to the second connector body and detachment of the second connector body from the first connector body.

Moreover, in a case where one of the first connector body and the second connector body is mounted on the ground or the like, a worker can perform the above-described rotation with one hand. That is, unlike a known technology, the worker does not need to press the lower end of a lever member with one hand while holding a designated unit with another hand. Thus, the worker can work in a safe position. As a matter of course, the worker can perform the rotation with both hands. In this case, the worker can work in a safer position. In addition, no additional mechanisms for, for example, holding one of the first connector body and the second connector body and rotating the other are required. Consequently, an increase in cost or a reduction in space for the workstation can be avoided.

In a case where automation is implemented, a mechanism for rotating one of the first connector body and the second connector body will suffice. This is because the second connector body is locked and unlocked by rotating the second connector body relative to the first connector body. That is, no additional mechanisms other than a rotating mechanism are required. Thus, an increase in the number of mechanisms or a reduction in space for the workstation can be kept to minimum. Moreover, automation can also be easily implemented.

A cutout part extending to an end of the shaft portion may be formed in the sidewall of the shaft portion at a region in a phase that is different from the phase of the keyway. In this case, the engaging portion is prevented from interfering with the end of the shaft portion by inserting the shaft portion into the attachment hole such that the phase of the engaging portion match the phase of the cutout part. That is, the shaft portion is inserted into the attachment hole smoothly. In contrast, in a case where the phases of the engaging portion and the cutout part do not match, the engaging portion inserted into the attachment hole interferes with the end of the shaft portion and cannot be further inserted. In this manner, formation of the cutout part prevents the shaft portion from being inserted into the attachment hole in an incorrect phase.

Moreover, the first connector body is preferably provided with a stopper portion coming into contact with the second connector body to stop rotation of the second connector body when the engaging portion is disposed in a phase where the engaging portion engages with the keyway. In this case, the second connector body stops rotating in a predetermined phase. Thus, for example, in a case where the second connector body is a supporting jig configured to support a workpiece, the workpiece can be positioned with an excellent accuracy.

The engaging portion preferably presses the shaft portion in a same direction as a rotating direction of the shaft portion. That is, for example, the direction along which the engaging portion presses the shaft portion may be clockwise when the shaft portion rotates clockwise, and may be counterclockwise when the shaft portion rotates counterclockwise. In this case, the shaft portion is prevented from rotating in the opposite direction, facilitating locking and preventing separation of the shaft portion from the attachment hole.

The connector preferably includes a plurality of types of the second connector bodies with different shapes, specifications, and the like. In a case where the second connector bodies are configured as supporting jigs, the various supporting jigs prepared can support various workpieces with different shapes, sizes, and the like.

According to the present invention, the engaging portion engages with or is separated from the keyway formed in the shaft portion constituting the second connector body by rotating the second connector body relative to the first connector body. Since the second connector body is locked with the engagement and unlocked with the separation, a simple task of rotating the second connector body relative to the first connector body results in attachment of the first connector body to the second connector body and detachment of the second connector body from the first connector body. Thus, the worker can work in a stable posture.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a connector according to the present invention will now be described in detail with reference to the drawings.

Figure 1:
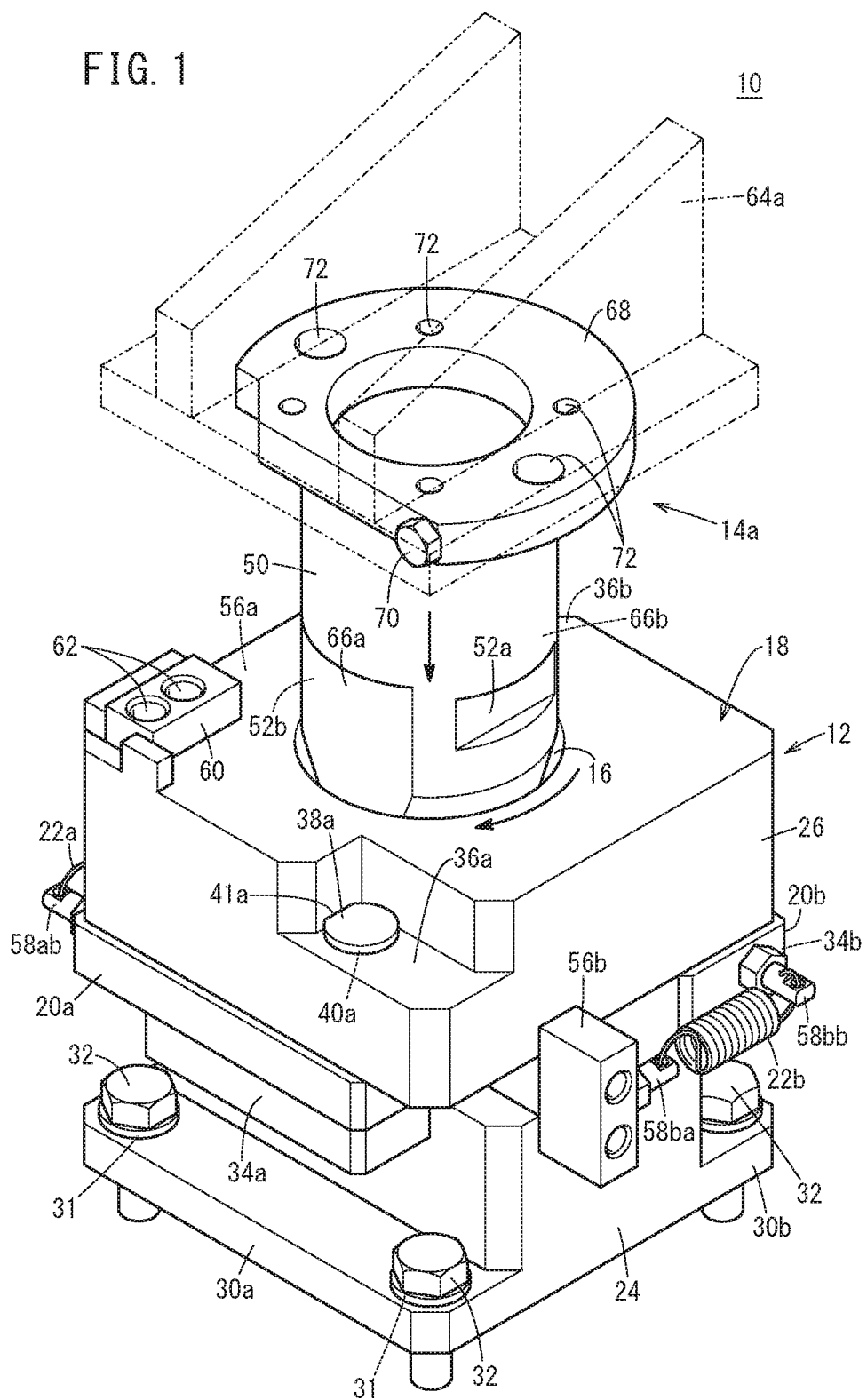
FIG. 1 is an overall schematic perspective view of a connector according to an embodiment of the present invention before a shaft portion rotates.
Figure 2:
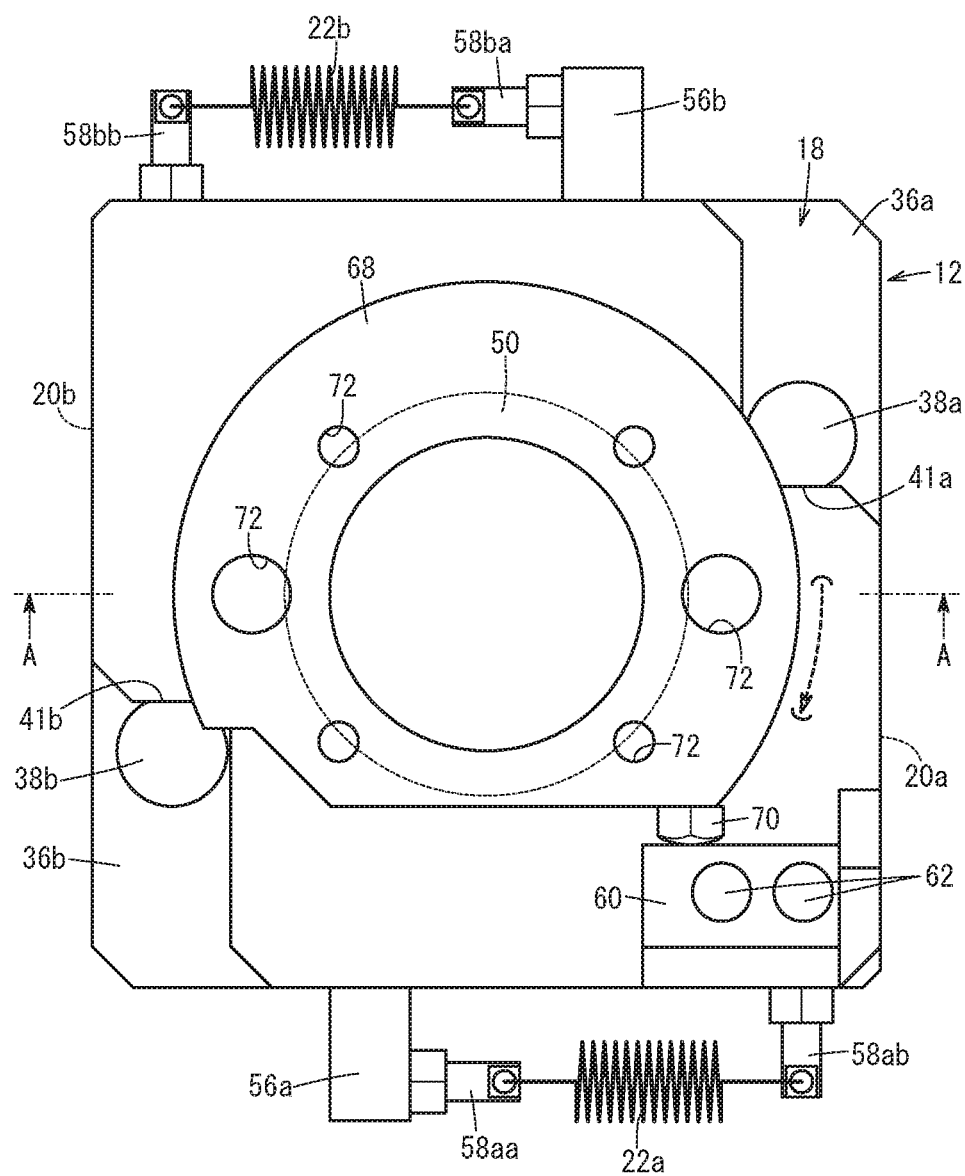
FIG. 2 is an overall schematic plan view of the connector after the shaft portion rotates.

FIGS. 1 and 2 are an overall schematic perspective view and an overall schematic plan view, respectively, of a connector 10 according to this embodiment. The connector 10 includes a general-purpose base 12 serving as a first connector body and an designated supporting jig 14a serving as a second connector body. The general-purpose base 12 is positioned and secured onto, for example, a floor F of a workstation (see FIG. 4). The designated supporting jig 14a is detachable from the general-purpose base 12. FIG. 1 illustrates a state before the designated supporting jig 14a rotates, and FIG. 2 illustrates a state after the designated supporting jig 14a rotates. Moreover, for ease of understanding, FIG. 2 illustrates only the top surface of a shaft portion 50 constituting the designated supporting jig 14a.

The general-purpose base 12 includes a base body 18 having a vertically extending attachment hole 16 and provided with a first pivoting plate 20a and a second pivoting plate 20b serving as pivoting members and a first return spring 22a and a second return spring 22b (elastic members) configured to pull the first pivoting plate 20a and the second pivoting plate 20b to return the plates to the original positions. The base body 18 includes a pedestal-like lower section 24 having a substantially lying-on-the-side H shape when viewed from the front and a block-like upper section 26 by which the first pivoting plate 20a and the second pivoting plate 20b are pivotably supported.

A first leg portion 30a and a second leg portion 30b constituting the pedestal-like lower section 24 and serving as lower horizontal portions each have a plurality of bolt receiving holes 31. Installation bolts 32 fitted in the bolt receiving holes 31 are screwed into bolt screw holes 33 formed in, for example, the floor F. With this, the general-purpose base 12 is installed (positioned and secured.

A first holding portion 34a and a second holding portion 34b serving as upper horizontal portions protrude from regions of the pedestal-like lower section 24 adjacent to the block-like upper section 26 to be parallel to the first leg portion 30a and the second leg portion 30b, respectively. The first pivoting plate 20a is disposed in a clearance between the first holding portion 34a and the block-like upper section 26, and the second pivoting plate 20b is disposed in a clearance between the second holding portion 34b and the block-like upper section 26.

The block-like upper section 26 is provided with a first stepped portion 36a and a second stepped portion 36b recessed downward from the top surface. A first pivoting shaft 38a and a second pivoting shaft 38b are supported by the first stepped portion 36a and the second stepped portion 36b, respectively. More specifically, the first stepped portion 36a, the first pivoting plate 20a, and the first holding portion 34a each have through-holes 40a having a diameter smaller than the diameter of the head of the first pivoting shaft 38a (see FIG. 3). The body of the first pivoting shaft 38a is fitted in the through-holes 40a. The head of the first pivoting shaft 38a has a linear cutout portion 41a. Moreover, the first pivoting shaft 38a has a retaining hole 42a, extending in a direction orthogonal to the longitudinal direction of the body and being formed in a region exposed from under the first holding portion 34a. A split pin 43a is fitted in the retaining hole 42a (see FIG. 4), by which the first pivoting shaft 38a is prevented from falling out. The same applies to the second pivoting shaft 38b.

Figure 3:
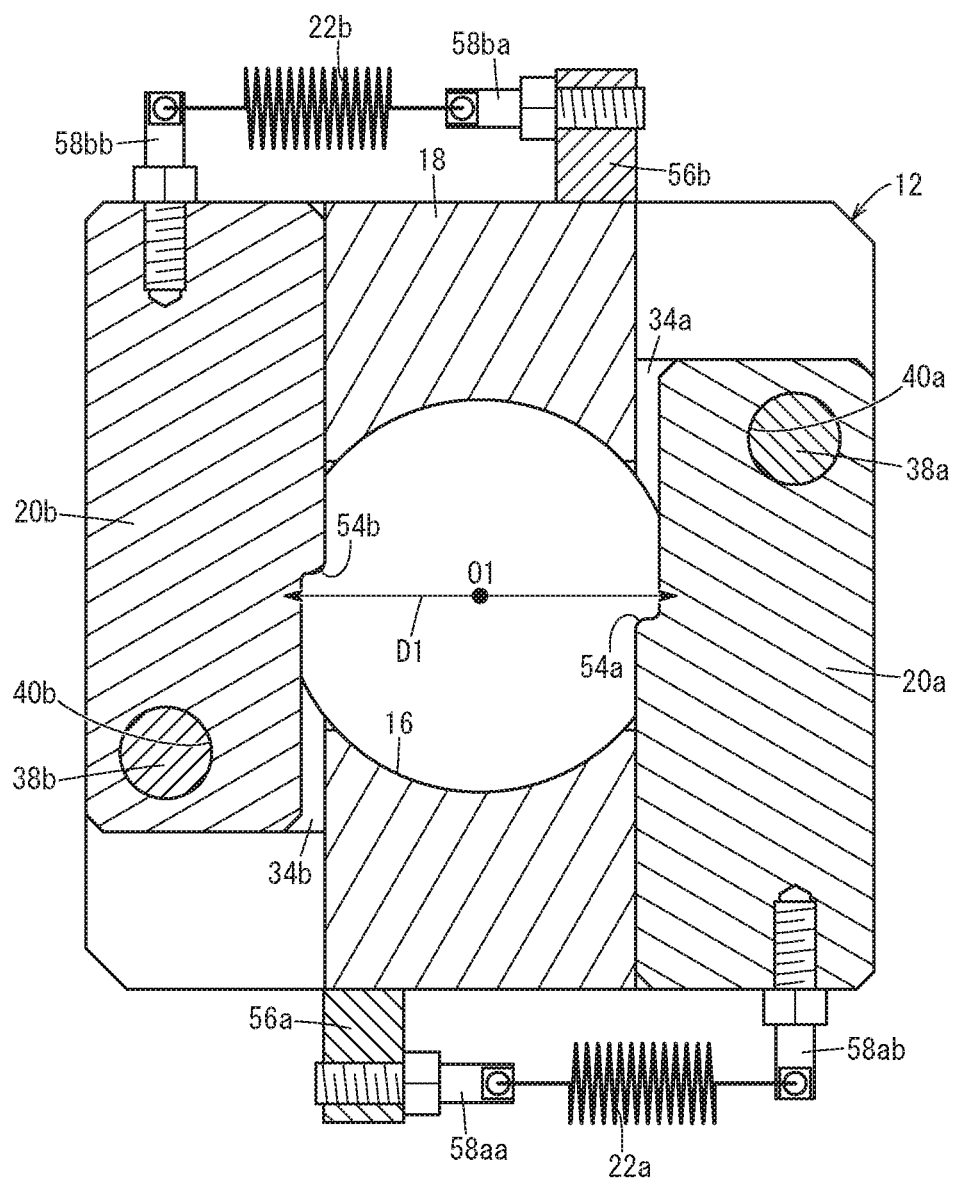
FIG. 3 is a partially sectioned plan view of a general-purpose base constituting the connector illustrated in FIG. 1.

FIG. 3 is a partially sectioned plan view of the general-purpose base 12. An end portion of the first pivoting plate 20a and an end portion of the second pivoting plate 20b facing the attachment hole 16 slightly protrude. The protruding end portions serve as a first engaging portion 54a and a second engaging portion 54b respectively engaging with a first keyway 52a and a second keyway 52b formed in the shaft portion 50 constituting the designated supporting jig 14a. This will be described in detail below. When a diameter D1 parallel to the first return spring 22a and the second return spring 22b is drawn across the attachment hole 16, the first engaging portion 54a and the second engaging portion 54b are offset with respect to the diameter D1, in other words, the center O1.

A first bracket 56a and a second bracket 56b are disposed in the vicinity of the border between the pedestal-like lower section 24 and the block-like upper section 26. The first bracket 56a is provided with a first stay 58aa, and the second bracket 56b is provided with a second stay 58ba. On the other hand, a first stay 58ab is disposed on an end surface of the first pivoting plate 20a, and a second stay 58bb is disposed on an end surface of the second pivoting plate 20b. The first return spring 22a is stretched between the first stay 58aa and the first stay 58ab, and the second return spring 22b is stretched between the second stay 58ba and the second stay 58bb. The first return spring 22a pulls the first pivoting plate 20a toward the first bracket 56a, and the second return spring 22b pulls the second pivoting plate 20b toward the second bracket 56b.

A stopper portion 60 having a rectangular parallelepiped shape is disposed on the upper surface of the block-like upper section 26. The stopper portion 60 is connected to the general-purpose base 12 by connecting bolts 62. As described below, the stopper portion 60 stops the rotation of the designated supporting jig 14a.

On the other hand, the designated supporting jig 14a includes the shaft portion 50 and a supporting portion 64a. The shaft portion 50 is detachably inserted into the attachment hole 16. The insertion and locking described later connect the general-purpose base 12 and the designated supporting jig 14a. The shaft portion 50 may be solid but is preferably hollow because the hollow one is lighter and easier to produce.

The first keyway 52a, a first cutout part 66a, the second keyway 52b, and a second cutout part 66b are formed in the circumferential sidewall of the shaft portion 50 with a phase difference of substantially 90°. Moreover, the phase difference between the first keyway 52a and the second keyway 52b and the phase difference between the first cutout part 66a and the second cutout part 66b are substantially 180°. The first engaging portion 54a and the second engaging portion 54b are set to be shallow compared with the first cutout part 66a and the second cutout part 66b, respectively.

A flange portion 68 with a large diameter is disposed on the upper end of the shaft portion 50. The flange portion 68 has a shape formed by linearly cutting a part out of an annular shape to form a chord part. A bolt 70 for a stopper is disposed on the chord part. The head of the bolt comes into contact with the stopper portion 60.

Pass-through holes 72 pass through the flange portion 68 in the thickness direction. The supporting portion 64a also has pass-through holes, and mounting bolts are inserted into the overlapped pass-through holes. The shaft portion 50 and the supporting portion 64a are connected with each other by screwing securing nuts onto the mounting bolts.

The supporting portion 64a is assembled to support a specific workpiece. That is, the designated supporting jig 14a is only compatible with a specific workpiece and does not support other workpieces.

The connector 10 according to this embodiment is basically configured as above. Next, the operational effects will be described.

Figure 4:
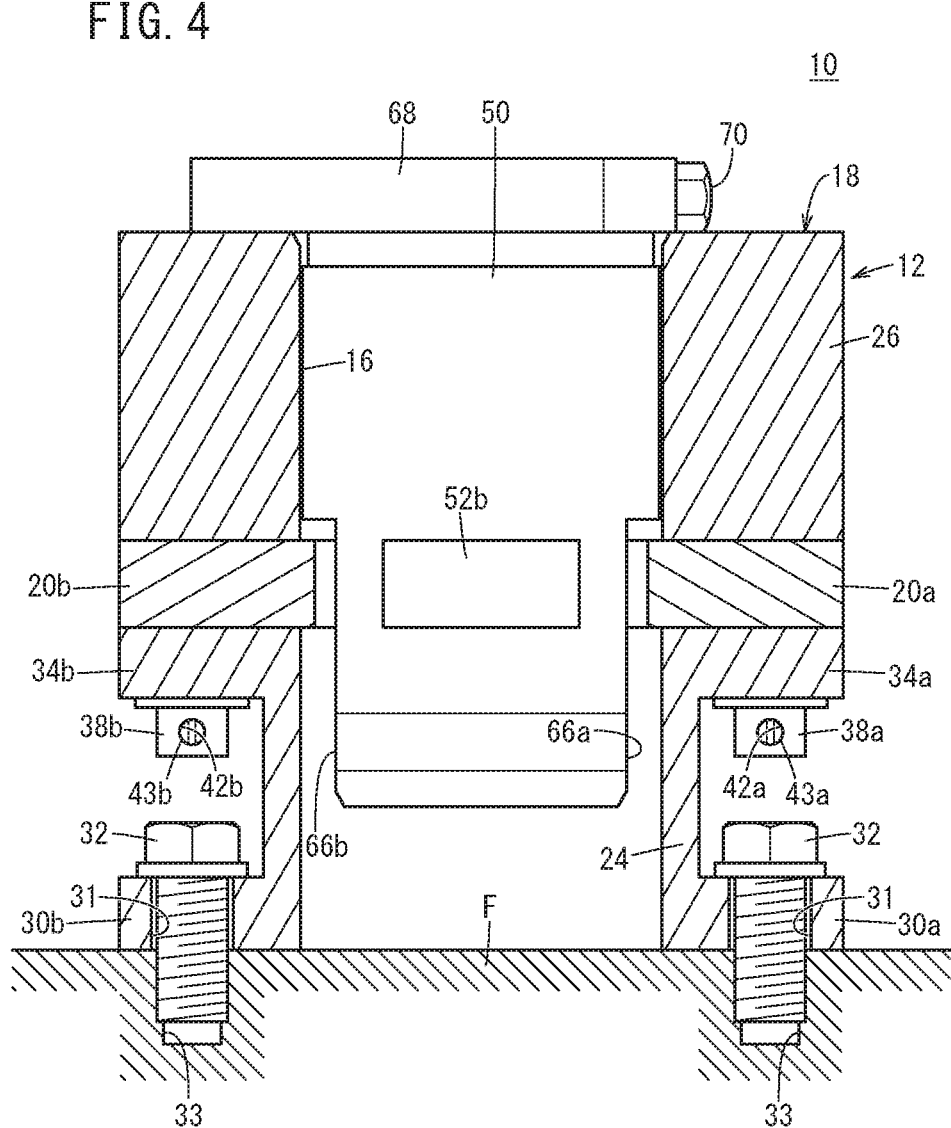
FIG. 4 is a cross-sectional view taken along line A-A in FIG. 2 when the shaft portion is fitted in an attachment hole.

To support a workpiece using the designated supporting jig 14a including the supporting portion 64a, first, the designated supporting jig 14a is attached to the general-purpose base 12. To do this, a worker holds the designated supporting jig 14a and inserts the shaft portion 50 into the attachment hole 16. At this time, the shaft portion 50 is disposed in a phase where the first keyway 52a faces the second return spring 22b and the second keyway 52b faces the first return spring 22a. The bolt 70 for the stopper is adjacent to the first stepped portion 36a. FIG. 4 is a cross-sectional view taken along line A-A in FIG. 2 when the shaft portion 50 in the above-described phase is fitted in the attachment hole 16.

At this time, the first engaging portion 54a of the first pivoting plate 20a faces the first cutout part 66a, and the second engaging portion 54b of the second pivoting plate 20b faces the second cutout part 66b. Thus, the first pivoting plate 20a and the second pivoting plate 20b are respectively pulled by the first return spring 22a and the second return spring 22b at the ends to which the first return spring 22a and the second return spring 22b are attached, and are kept at positions in contact with the base body 18 as illustrated in FIG. 3.

Figure 5:
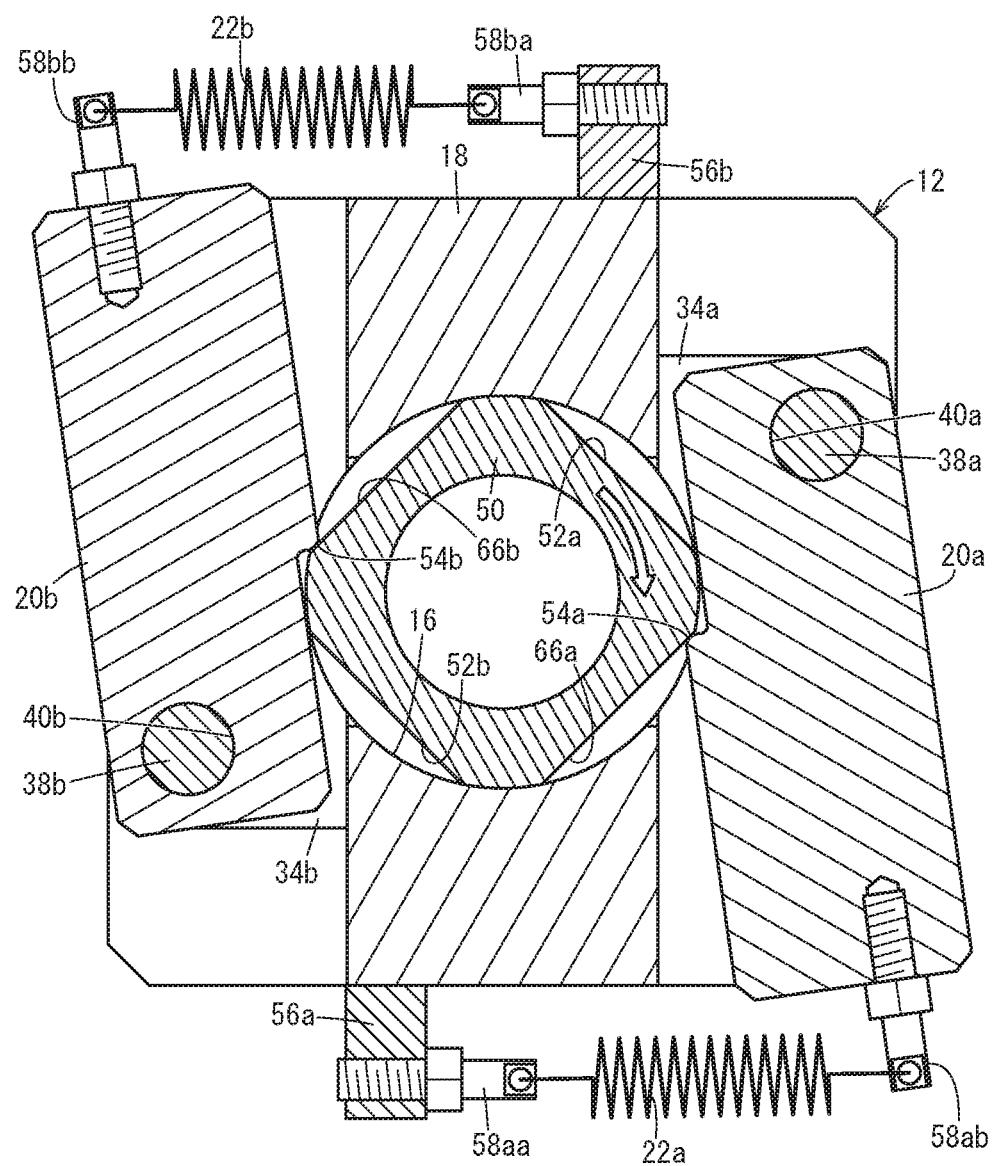
FIG. 5 is a partially sectioned plan view of the general-purpose base illustrating a state where pivoting plates have pivoted to maximum from the state illustrated in FIG. 3.

Next, the worker holds the supporting portion 64a, the flange portion 68, or the like and rotates the designated supporting jig 14a clockwise. During this process, the first engaging portion 54a separates from the first cutout part 66a and mounts on a part of the circumferential sidewall of the shaft portion 50 between the first cutout part 66a and the first keyway 52a. Similarly, the second engaging portion 54b separates from the second cutout part 66b and mounts on a part of the circumferential sidewall of the shaft portion 50 between the second cutout part 66b and the second keyway 52b. With this elevation, as illustrated in FIG. 5, the first pivoting plate 20a and the second pivoting plate 20b respectively pivot about the first pivoting shaft 38a and the second pivoting shaft 38b in directions away from the base body 18. At this moment, the first return spring 22a and the second return spring 22b stretch.

As the designated supporting jig 14a is further rotated clockwise, the first engaging portion 54a engages with the first keyway 52a, and the second engaging portion 54b engages with the second keyway 52b. At this moment, the first return spring 22a and the second return spring 22b shrink, and the first pivoting plate 20a and the second pivoting plate 20b respectively pivot about the first pivoting shaft 38a and the second pivoting shaft 38b in directions toward the base body 18.

Figure 6:
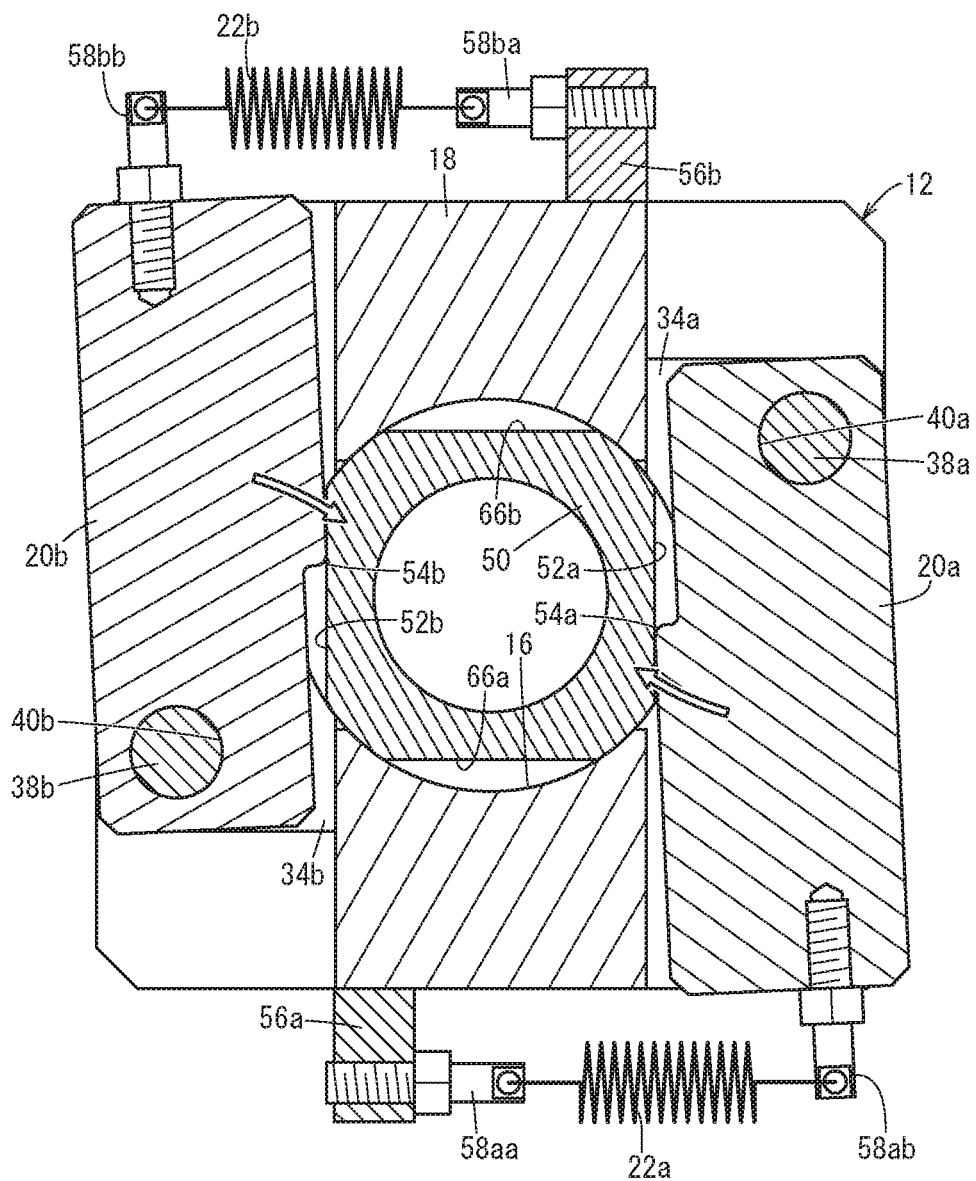
FIG. 6 is a partially sectioned plan view of the general-purpose base illustrating a state where the pivoting plates have returned from the state illustrated in FIG. 5 and engaging portions engage with keyways.

The rotation of the designated supporting jig 14a stops when the bolt 70 for the stopper comes into contact with the stopper portion 60 as illustrated in FIG. 2. At this moment, the first pivoting plate 20a and the second pivoting plate 20b stop pivoting while being slightly separated from the base body 18 as illustrated in FIG. 6. This is because the first engaging portion 54*a* and the second engaging portion 54*b* respectively engage with the first keyway 52*a* and the second keyway 52*b*, which are shallow compared with the first cutout part 66*a* and the second cutout part 66*b*, respectively. Moreover, an end part of the linear cutout portion 41*a* formed in the head of the first pivoting shaft 38*a* is in contact with a sidewall of the first stepped portion 36*a*, and an end part of the linear cutout portion 41*b* formed in the head of the second pivoting shaft 38*b* is in contact with a sidewall of the second stepped portion 36*b*, whereby the rotation of the first pivoting shaft 38*a* and the second pivoting shaft 38*b* is prevented.

Here, the first engaging portion 54*a* and the second engaging portion 54*b* are offset from the diameter D1 (center O1) of the attachment hole 16, the diameter D1 being parallel to the first return spring 22*a* and the second return spring 22*b* (see FIG. 4). Thus, in the state illustrated in FIG. 6, the elastic force of the first return spring 22*a* acts, via the first pivoting plate 20*a*, clockwise on the bottom surface of the first keyway 52*a* that is in contact with the first engaging portion 54*a*, and the elastic force of the second return spring 22*b* acts, via the second pivoting plate 20*b*, clockwise on the bottom surface of the second keyway 52*b* that is in contact with the second engaging portion 54*b*. Consequently, the designated supporting jig 14*a* is prevented from rotating counterclockwise.

Figure 7:
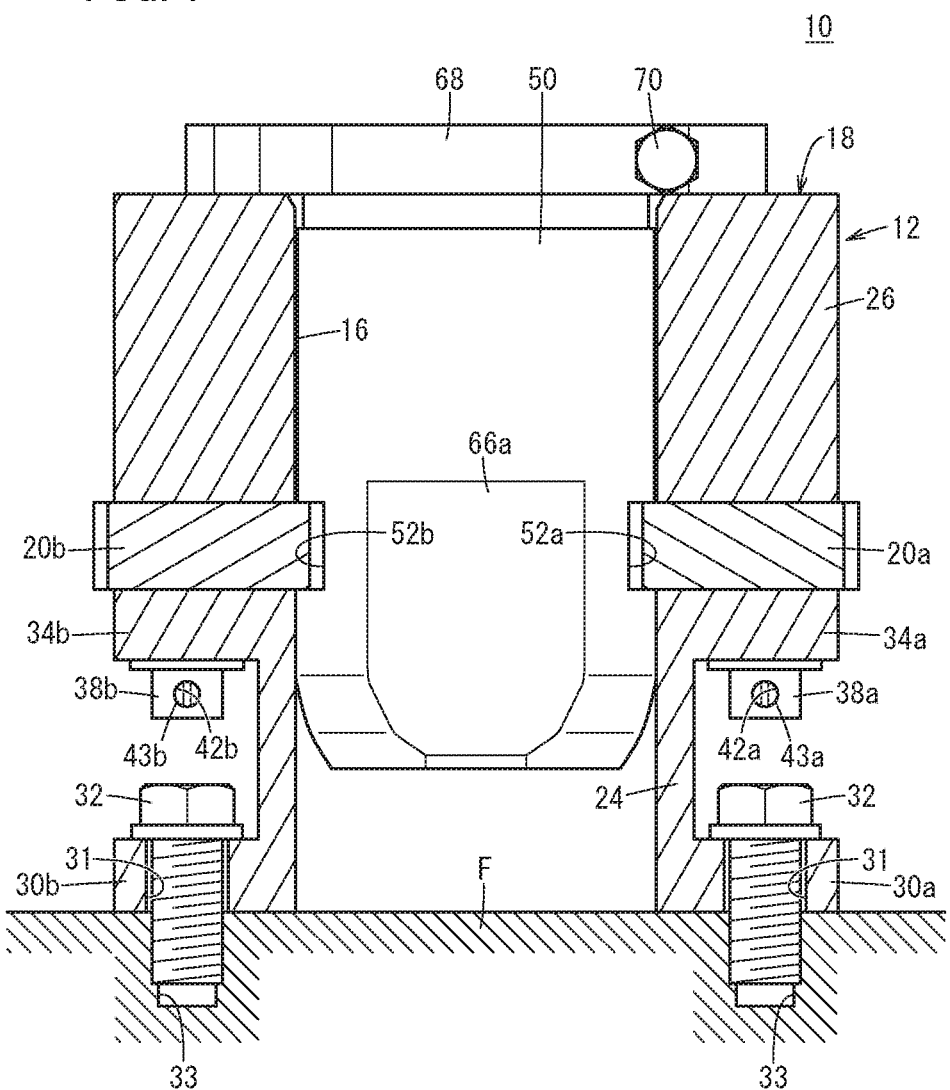
FIG. 7 is a cross-sectional view taken along line A-A in FIG. 2 when rotation of the shaft portion is stopped.

In this manner, the designated supporting jig 14*a* is prevented from rotating and falling out of (locked in) the attachment hole 16. That is, the designated supporting jig 14*a* is joined with the general-purpose base 12. FIG. 7 is a cross-sectional view taken along line A-A in FIG. 2 when the rotation of the shaft portion 50 is stopped.

Subsequently, the supporting portion 64*a* supports a workpiece corresponding to the shape, size, specifications, and the like of the supporting portion 64*a*. As described above, the designated supporting jig 14*a* is stopped while the bolt 70 for the stopper is in contact with the stopper portion 60. Thus, the supporting portion 64*a* is positioned in a predetermined phase. This allows the supporting portion 64*a* to position the workpiece with an excellent accuracy.

Here, when the shaft portion 50 is inserted into the attachment hole 16 while the shaft portion 50 is disposed in a phase where the first cutout part 66*a* faces the first return spring 22*a* and the second cutout part 66*b* faces the second return spring 22*b*, the top surfaces of the first engaging portion 54*a* and the second engaging portion 54*b* interfere with the circumferential sidewall of the shaft portion 50. This makes it difficult for the shaft portion 50 to be further inserted. In this manner, the first cutout part 66*a* and the second cutout part 66*b* formed in the shaft portion 50 prevent the shaft portion 50 from being inserted into the attachment hole 16 in an incorrect phase.

Figure 8:
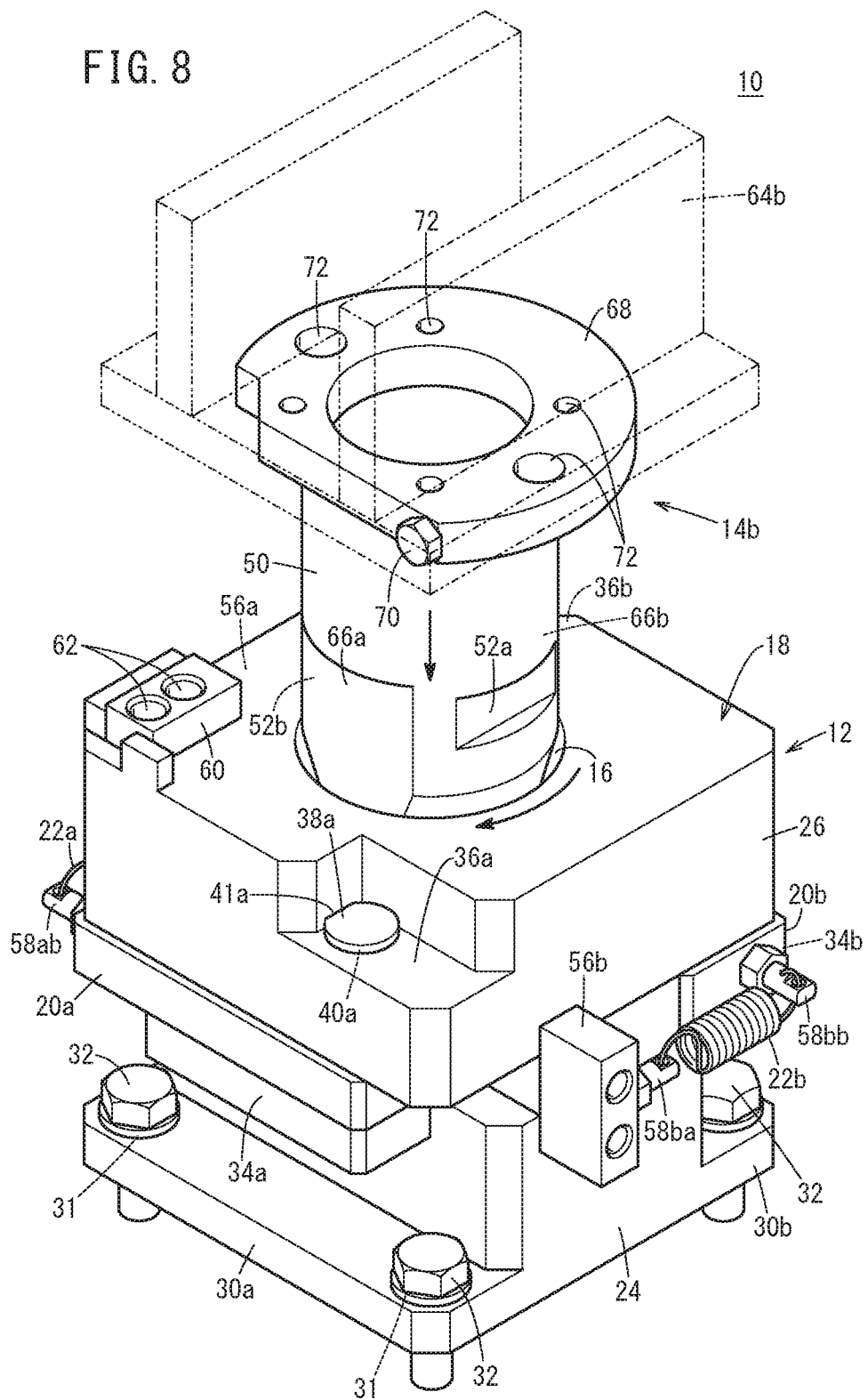
FIG. 8 is an overall schematic perspective view of the connector to which another designated supporting jig different from the designated supporting jig illustrated in FIG. 1 is attached.

In a case where the designated supporting jig 14*a* is replaced with an designated supporting jig 14*b* including a supporting portion 64*b* as illustrated in FIG. 8, the worker holds the supporting portion 64*a*, the flange portion 68, or the like and rotates the designated supporting jig 14*a* counterclockwise. This rotation causes the first engaging portion 54*a* to separate from the first keyway 52*a* and mount on the part of the circumferential sidewall of the shaft portion 50 between the first keyway 52*a* and the first cutout part 66*a*, and causes the second engaging portion 54*b* to separate from the second keyway 52*b* and mount on the part of the circumferential sidewall of the shaft portion 50 between the second keyway 52*b* and the second cutout part 66*b*. As a result, the first pivoting plate 20*a* and the second pivoting plate 20*b* respectively pivot about the first pivoting shaft 38*a* and the second pivoting shaft 38*b* in directions away from the base body 18, and the first return spring 22*a* and the second return spring 22*b* stretch (see FIG. 5).

As the designated supporting jig 14*a* is further rotated counterclockwise, the first engaging portion 54*a* enters the first cutout part 66*a*, and the second engaging portion 54*b* enters the second cutout part 66*b*. Moreover, the first return spring 22*a* and the second return spring 22*b* shrink, and the first pivoting plate 20*a* and the second pivoting plate 20*b* respectively pivot about the first pivoting shaft 38*a* and the second pivoting shaft 38*b* until coming into contact with the base body 18. As a result, the first engaging portion 54*a* and the second engaging portion 54*b* no longer interfere with the shaft portion 50. That is, the shaft portion 50 is unlocked and becomes detachable from the attachment hole 16. Moreover, an end part, opposite to the above-described end part, of the linear cutout portion 41*a* formed in the head of the first pivoting shaft 38*a* is in contact with the sidewall of the first stepped portion 36*a*, and an end part, opposite to the above-described end part, of the linear cutout portion 41*b* formed in the head of the second pivoting shaft 38*b* is in contact with the sidewall of the second stepped portion 36*b*, whereby the rotation of the first pivoting shaft 38*a* and the second pivoting shaft 38*b* is prevented.

The worker now holds and raises the designated supporting jig 14*a*. After the designated supporting jig 14*a* is detached from the attachment hole 16 in this manner, the shaft portion 50 of the designated supporting jig 14*b* is inserted into the attachment hole 16 and rotated clockwise in the same manner as above, whereby the designated supporting jig 14*b* is locked. When the designated supporting jig 14*b* is replaced with the designated supporting jig 14*a* or other designated supporting jigs, the designated supporting jig 14*b* is rotated counterclockwise to be unlocked.

In this manner, according to this embodiment, the worker does not need to hold the general-purpose base 12 to attach or detach the designated supporting jig 14*a*, 14*b*, or the like to or from the general-purpose base 12. That is, the worker can hold the designated supporting jig 14*a*, 14*b*, or the like with, for example, one hand and thus can work in a stable posture.

Moreover, no additional mechanisms for, for example, rotating the designated supporting jig 14*a*, 14*b*, or the like and holding the general-purpose base 12 are needed. Consequently, an increase in cost or a reduction in space for the workstation can be avoided.

To automate the above process, only a mechanism for rotating the designated supporting jig 14*a*, 14*b*, or the like will suffice. As described above, the designated supporting jig 14*a*, 14*b*, or the like is locked or unlocked by being rotated. Thus, no additional mechanisms other than a rotating mechanism are required. That is, an increase in the number of mechanisms or a reduction in space for the workstation can be kept to a minimum. Moreover, automation can also be easily implemented.

The present invention is not limited to the above-described embodiment, and various modifications and equivalents can be made without departing from the spirit and scope of the present invention.

For example, the attachment hole 16 may be formed in the designated supporting jig 14*a*, 14*b*, or the like, and the shaft portion 50 may be provided for the general-purpose base 12. In this case, the general-purpose base 12 serves as the second connector body, and the designated supporting jig 14*a*, 14*b*, or the like serves as the first connector body.

Moreover, the second connector body is not particularly limited to the supporting jig and may be a working arm executing some work.

What is claimed is:

1. A detachable workpiece support, comprising:
a first connector body with an attachment hole; and
a second connector body provided with a shaft portion, wherein:
the shaft portion is fitted in the attachment hole to connect the first connector body and the second connector body;
a keyway and a cutout part that extends to an end of the shaft portion and is deeper than the keyway are formed in a sidewall of the shaft portion with different phases;
the first connector body is provided with
a pivoting member being connected to the first connector body through a pivoting shaft and pivoting about the pivoting shaft by being pressed by the shaft portion rotating inside the attachment hole and
an elastic member for returning to an original position the pivoting member that has pivoted; and
the pivoting member is provided with an engaging portion engaging with the keyway,
a first phase of the different phases comprises a condition in which the cutout part faces the engaging portion, wherein the engaging portion does not interfere with the shaft portion and the shaft portion is fully insertable into the attachment hole,
and a second phase of the different phases comprises a condition in which the keyway faces the engaging portion, wherein the engaging portion interferes with the shaft portion, and wherein the engaging portion prevents insertion of the shaft portion into the attachment hole.

2. The detachable workpiece support according to claim 1, wherein a cutout part extending to an end of the shaft portion is formed in the sidewall of the shaft portion at a region in a phase that is different from the phase of the keyway.

3. The detachable workpiece support according to claim 1, wherein the first connector body is provided with a stopper portion coming into contact with the second connector body to stop rotation of the second connector body when the engaging portion is disposed in a phase where the engaging portion engages with the keyway.

4. The detachable workpiece support according to claim 1, wherein the engaging portion presses the shaft portion in a same direction as a rotating direction of the shaft portion.

5. The detachable workpiece support according to claim 1, wherein the second connector body includes a plurality of types of the second connector bodies.

6. The detachable workpiece support according to claim 1, wherein the engaging portion is offset with respect to a center of the attachment hole.

7. The detachable workpiece support according to claim 1, wherein:
the first connector body includes two of the pivoting members and two of the elastic members; and
two of the keyways are formed in the sidewall of the shaft portion.

8. The detachable workpiece support according to claim 1, wherein the second connector body is a supporting jig configured to support a workpiece.

* * * * *